Nov. 15, 1966   J. H. BEVERIDGE   3,285,098
CONNECTING ROD FOR RECIPROCATING PISTON MACHINE
Filed March 22, 1965   2 Sheets-Sheet 1
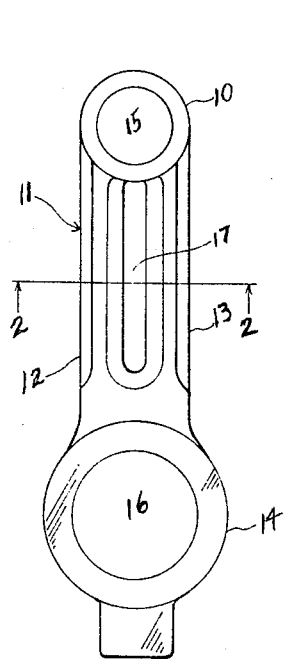
Fig.1
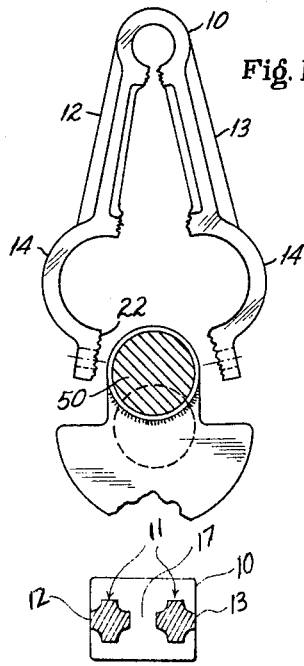
Fig.10
Fig.2
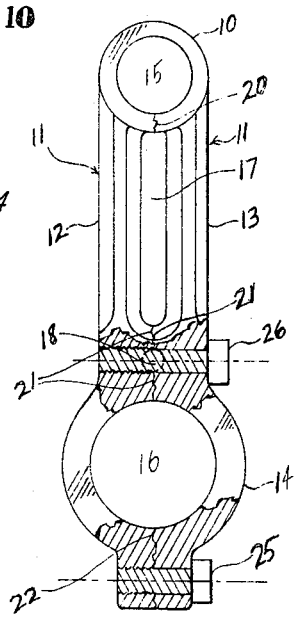
Fig.3
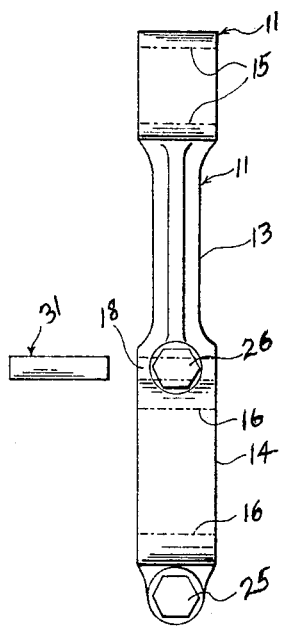
Fig.4
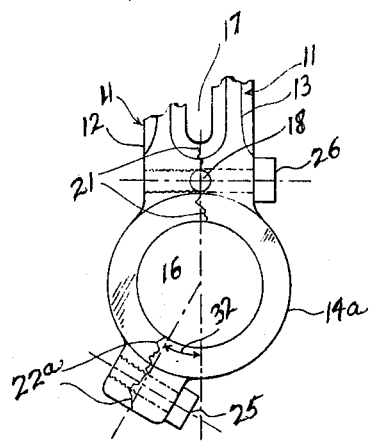
Fig.5
INVENTOR.
*JOHN HERBERT BEVERIDGE*
BY *Warren T. Jessup*
*ATTORNEY*

Nov. 15, 1966  J. H. BEVERIDGE  3,285,098

CONNECTING ROD FOR RECIPROCATING PISTON MACHINE

Filed March 22, 1965  2 Sheets-Sheet 2

INVENTOR.
JOHN HERBERT BEVERIDGE
BY Warren T. Jessup
ATTORNEY

United States Patent Office 3,285,098
Patented Nov. 15, 1966

3,285,098
CONNECTING ROD FOR RECIPROCATING
PISTON MACHINE
John Herbert Beveridge, P.O. Box 7091, Perkins, Calif.
Filed Mar. 22, 1965, Ser. No. 445,836
18 Claims. (Cl. 74—579)

This is a continuation-in-part of my copending application Serial No. 399,315, filed September 25, 1964, now abandoned.

This invention relates generally to the art of reciprocating piston machines and more specifically to the design, method of manufacture, and installation of connecting rods.

The function of a connecting rod is to connect a reciprocating piston to a rotating crankshaft crank pin. The trend of development of reciprocating piston machines is toward higher speed and consequently more highly loaded connecting rods. In order to preserve reliability of operation, it is necessary that the design, material selection, heat treatment, and quality of manufacture be consistent with the increased demands required by modern reciprocating piston machines.

An object of my invention is to provide a connecting rod more appropriate for the requirements of modern, high-speed reciprocating piston machines.

A further objective of my invention is to provide an improved connecting rod without substantially increasing its cost of manufacture and without altering the desirable performance characteristics of the machine in which it is installed.

Two types of connecting rods are currently in general use, single-piece and two-piece connecting rods. The single piece connecting rod is utilized in engines or reciprocating piston machines which incorporate built-up crankshafts. This type of connecting rod has found wide application in single-cylinder engines and in twin-cylinder engines which have only one crank pin. Multiple cylinder reciprocating piston machines generally utilize two-piece connecting rods so as to permit assembly of the connecting rods with their respective crank pins on the one-piece integral crankshaft. Separation of the ring at the crank pin end of the connecting rod is normally done in a plane normal to the longitudinal axis of the connecting rod and through the major diameter of the crank pin ring portion of the connecting rod. The two portions of the crank pin ring portion are normally secured together by bolting means so as to firmly clamp the two portions of the crank pin ring together, thereby permitting tension loads to be transmitted through the connecting rod.

In high-speed reciprocating piston machines, such as internal combustion engines of the two-stroke cycle and four-stroke cycle types, the load on the crank pin ring portion of the connecting rod consists of the sum of two loads. The first is the load along the longitudinal axis of the connecting rod produced by the restraining of the motion of the piston assembly. The second major load is the inertia load created by the rotary motion of the crank pin end of the connecting rod and the reciprocating motion of the piston pin end of the connecting rod. It is customary to sum the reciprocating inertia load of the piston pin ring portion of the connecting rod and the inertia load of the piston assembly. Thus, the total inertia load on the connecting rod at the crank pin ring consists of a load vector which rotates with the crank pin and is a constant load at constant speed (increasing with the square of the speed), plus a reciprocating inertia load associated with the reciprocating motion of the piston pin ring portion of the connecting rod and the piston assembly. The latter has a peak inertia loading at top dead center position and at bottom dead center position of the crankshaft rotation. It is approximately zero near the 90° and 270° positions of the crankshaft.

For reciprocating piston machines of compact design, the length of the connecting rod in comparison with the stroke may become sufficiently short that the acceleration diagram of the piston pin ring portion of the connecting rod is appreciably altered from that of simple harmonic motion. The effect of a relatively short connecting rod is to increase the deceleration and acceleration of the piston and piston pin ring portion of the connecting rod near the top dead center position and reduce the deceleration and acceleration near the bottom dead center position of the crankshaft. Thus, for compact, high-speed reciprocating piston machines, the inertia load at or near top dead center is appreciably more severe than for less compact and lower-speed reciprocating piston machines. Gas pressure forces on the piston tend to reduce the peak loads at top dead center on compression and expansion strokes. However, gas forces at the top dead center position of the crankpin are negligible on exhaust and instake strokes. Since the inertia loading has been significantly increased near the top dead center position of the revolution of the crankshaft and reduced near the bottom dead center position of the revolution of the crankshaft, connecting rods for modern, compact, high-speed, reciprocating piston machines must be designed and manufactured to withstand the type of loading incurred near the top dead center position of the crankshaft revolution. To decelerate and accelerate the piston and piston pin portion of the connecting rod near the top dead center postion induces tensile loading in the connecting rod. Thus, comparatively speaking, modern connecting rods must be engineered for extremely high tensile loads as compared with compressive loads.

The position of maximum inertia loading in the crank pin ring portion of the connecting rod is at, or near, a plane normal to the longitudinal axis of the connecting rod and at the maximum diameter of the crank pin ring. This is also the plane in which conventional two-piece connecting rods are split for installation over the crankshaft assembly and subsequently bolted together. Thus, in a conventional two-piece connecting rod, the bolts are heavily loaded in tension due to the inertia loading of the connecting rod and reciprocating piston attached thereto. The bolts are also subjected to loading associated with the bending moment induced in the crank pin ring portion of the connecting rod assembly. Thus, it is not surprising that the bolts in the crank pin ring portion of the conventional connecting rod have become a major weakness of the conventional connecting rod.

Use of ultra-high-strength bolts has become commonplace in high-speed reciprocating piston machines incorporating two-piece connecting rods of conventional design. By increasing the size of the connecting rod bolts and the dimensions and proportions of the crank pin ring portion of the connecting rod, additional strength and rigidity has been obtained. These increased proportions have resulted in increased weight of the crank pin ring portion of the connecting rod and an increased bearing load on the crank pin throughout the entire revolution of the crankshaft. It is desirable to minimize this continuous loading, thereby reducing bearing friction and the heat transferred to the bearing cooling system and oiling system. Although the magnitude of the rotating load vector has been relatively small as compared with the magnitude of the reciprocating inertia load vector, the trend is for the rotating load vector to increase and this is undesirable.

It is a further object of my invention to provide a connecting rod with minimum mass of material for the crank pin ring portion of the connecting rod, thereby minimizing the magnitude of the crank pin ring portion inertia load, while maintaining maximum crank pin ring portion rigidity and, hence, load capacity. To accomplish these and other objectives in a practical manner, I have created new and unique designs for a connecting rod applicable to multiple-cylinder and single-cylinder reciprocating piston machines.

In the drawing, FIGURE 1 is a view taken normal to the piston pin and crank pin showing the connecting rod in an early stage of fabrication.

FIGURE 2 is a cross section on line 2—2 in FIGURE 1.

FIGURE 3 is a view similar to FIGURE 1 showing the completed rod.

FIGURE 4 is a side view of the rod shown in FIGURE 3.

FIGURE 5 is a fragmentary view similar to FIGURE 3 showing an alternative form of structure.

FIGURE 10 is a view generally similar to FIGURE 3 showing the rod spread apart for placement over a crank pin.

Figure 6:
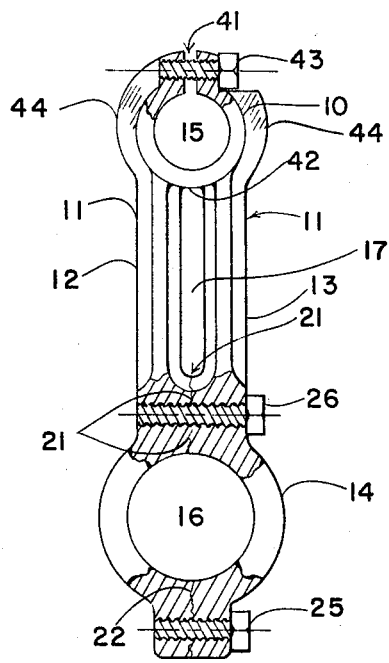
FIGURE 6 is a view similar to FIGURE 3 showing another form of the present invention.
Figure 7:
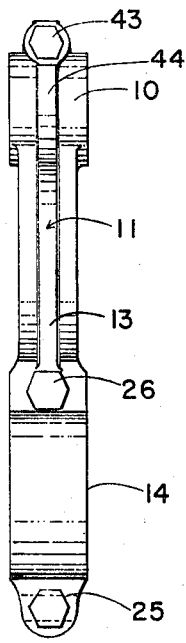
FIGURE 7 is a side view of the rod shown in FIGURE 6.

Practice of this invention may start with the rod shown in FIGURE 1, which is a view of a single-piece, unitary-integral cast or forged connecting rod suitable for application to multiple-cylinder engines and single-cylinder engines incorporating single-piece integral crankshafts. The connecting rod comprises a piston pin ring portion 10, integral with a shank 11, comprised of two branches 12 and 13, and a crank pin ring portion 14, integral with the shank 11. The piston pin ring portion 10 has a bore 15; the crank pin ring portion 14 has a bore 16; and the shank 11 has a slot 17, which forms the branches 12 and 13.

FIGURE 3 is a completely machined, unitary, integral connecting rod manufactured from the unitary blank shown in FIGURE 1. In FIGURE 3 the rod of FIGURE 1 has been bifurcated longitudinally starting at the bottom (crank pin end) and continuing upward to the piston pin bore 15. This bifurcation is preferably done by fracturing the material of the rod, rather than by sawing. The crank pin ring portion 14 is broken at 22, generally opposite from the shank 11. It is also broken at 21, the break from the slot 17, in the shank 11 to the bore 16. The bifurcation is continued at the upper end of slot 17 by a break 20 extending from slot 17 to bore 15. Although the break 22 need not be directly opposite shank 11 (as seen by the variant of FIGURE 5), the bifurcation extends generally along a longitudinal plane substantially passing through the axes of the bores 15 and 16.

Since the preferred method of manufacturing the connecting rod is from the single, unitary, cast or forged blank of FIGURE 1, a preferred method of bifurcation is to fracture the material of the rod, metal or otherwise, so as to obtain interlocking mating surfaces without the need for expensive and time-consuming metal removal operations. The fracturing of the metal may be by tensile or shear forces introduced into the part by external means. To obtain fracture with minimum external forces and with minimal yielding of the material along the fractured surface, it is desirable to have the material in a brittle condition. This may be readily accomplished by locally changing the chemistry of the material such as by carburizing and heat treating or by lowering the temperature of the material to its ductile-brittle transition temperature. Such fracturing along the plane of bifurcation may be accomplished without significant danger of fracturing at other than the desired locations, by suitable and local application of force and by fixturing which limits the deflection of the branches 12 and 13 after fracture. With some materials of construction desirable for connecting rods, metal removal processes are necessary in order to accomplish the bifurcation. Modern metal removal processes such as electrical discharge machining allow accurate interlocking mating surfaces to be machined with minimum metal removal.

The finished connecting rod of FIGURE 3 incorporates clamping means in the form of bolts 25 and 26 for securing and firmly clamping the bifurcated portions of the crank pin ring portion 14 and the branches 12 and 13 of the shank together. In some applications, it may be desirable to incorporate only a single bolt to secure and tightly clamp the portions together. In other applications, it may be desirable to incorporate a third bolt near the bifurcation 20 of the piston pin ring portion 10. Generally speaking, the third bolt would not be required because insertion of the piston pin through the bore 15 may be accomplished prior to the time of assembly of the rod onto the crank pin. The branches of the shank 11 are spread, thereby temporarily enlarging the bore 15 of the piston pin ring portion 10, thereby permitting easy assembly of the piston pin through the bore 15. Provided there is a slight interference fit between the diameter of the piston pin and the normal bore diameter 15, the piston pin will be tightly and securely clamped by the closure of the piston pin ring portion 10. This feature greatly simplifies the assembly of the connecting rod and piston pin, because it eliminates the need for a press operation to insert the interference fit piston pin into the bore 15. It also eliminates the need for a separate piston pin locking means in many cases.

As shown in FIGURE 10, to assemble the rod on a crank pin 50, the break 22 is widened by separating the branches 12 and 13 until it can be slipped over the pin. The rod is then allowed to close, reconstituting the bore 16 around the pin. Bolts 25 and 26 (FIGURE 3) are then inserted and tightened to hold the rod together firmly as an integrated structure.

At the base of the shank 11, adjacent to the intersection of the crank pin ring portion 14, a transverse aperture 18, is provided. A stop member, such as a rod 31, may be inserted through the aperture 18. The bolt 26 may then be inserted inversely, i.e., in the threaded end of its bore. After the bolt 26 abuts the rod 31, further screwing in of the bolt causes the branches 12 and 13 to spread, thereby permitting assembly of the crank pin ring portion 14 over and on a crank pin. Subsequent removal and normal insertion of the bolting means 26 completes the assembly of the connecting rod on the crank pin.

FIGURE 2 is a cross section through the shank 11, normal to the longitudinal axis of the connecting rod. The specific cross-section shape of the branches 12 and 13, of the shank 11 is not important to the functioning of the connecting rod; however, several considerations are important. The shank 11 is subjected to compressive as well as tensile loads; thus it is desirable to form sections which are resistant to buckling. Secondly, there are inertia loads created in the material of the shank as a result of lateral accelerations. These accelerations are maximum near the crank pin ring portion 14. Thus, the section modulus should be stiffened accordingly near the crank pin end of said shank. A third consideration is that it is desirable to have a portion of the deflection which is necessary for installation of the connecting rod over the crank pin occur in the branches of said shank. Thus, the branches 12 and 13 should be reasonably flexible to permit deflection without over stressing the material of the branches during installation of said connecting rod. This consideration is particularly important at the juncture of the branches of the shank and the piston pin ring portion 10, of the connecting rod.

In a similar manner the specific cross-section shape of the piston pin ring portion 10 does not affect the functioning of the connecting rod. However some design consideration is appropriate. It is desirable for the section modulus of the piston pin ring portion 10 to be balanced relative to the section modulus of the branches of the shank 11 such that the required deflection of the piston pin ring portion 10 is obtained for installation of the rod over the crank pin without over stressing the material of the piston pin ring portion. This may be accomplished by making the ring section 10 comparatively wide and thin. Particular care must be exercised in the transition zone between the sections of the piston pin ring portion and the sections of the branches 12 and 13 of the shank adjacent thereto.

FIGURE 5 is a view of a modified form of the invention. Specifically, it shows an entire crank pin ring portion 14a and a portion of the shank 11. A preferred location for the break 22a in the crank pin ring portion 14a spaced away from the shank 11 is shown. This preferred location results in minimum bolt tensile loading. In this general location, the break in the crank pin ring portion 14a is subjected to a minimum bending moment. Thus, the tensile loading in the bolt 25, or other clamping means, need only be designed to react in opposition to the tensile loading in the ring 14a at that location. The shear load may be transmitted by the irregular mating surfaces of the clamped joint 22a of the ring. Since the bolt tensile load and bending moment are minimal in this region, the size of the bolt and the flange width requirements for transmitting bending moment across the joint 22a are minimal. Thus, a reliable minimum material and weight joint is obtained. Rotation of the bifurcation or fracture 22a in the crank pin ring portion 14a, through an angle 32 away from the longitudinal plane, as shown in FIGURE 5, results in a slight increase in deflection requirement for installation of the connecting rod over a crank pin. This slight increase in deflection, however, does not present a significant problem in the design or application of the unitary connecting rod. The angle 32 may be anywhere from 0° to 60°.

The fracture 21 between the bore 16 and slot 17 need not lie on the center line of the rod, or even parallel it. Since this is the high-bearing load region, it may be desirable to move the fracture 21 to the side and also offset it angularly, in a manner similar to the offset of the fracture 22a in FIGURE 5.

In the modification shown in FIGURE 6, the piston pin ring portion 10 remains unfractured, as shown at 42. This portion then forms a hinge region, about which the branches 12 and 13 pivot as they are spread apart. To permit this pivoting, the opposite side of the piston pin ring portion 10 is slotted as shown at 41. The adjacent faces forming the slot 41 are drawn toward each other as the branches 12 and 13 are deflected. This permits the region 42 to serve as a hinge or deflection member without structural resistance from the remainder of the piston pin ring portion 10.

The slot 41 has clamping means such as bolt 43 to complete the structural ring around the piston ring and to secure the piston pin to the connecting rod. The bolt 43 may also be used to aid in the assembly of the connecting rod over the crank pin. This is accomplished by tightening the bolt 43 without having the piston pin located in bore 15. This action supplements the spreading apart of the lower portions of the branches 12 and 13, and in certain cases may be the only deflecting means required. Thereafter, loosening of bolt 43 and insertion of the piston pin at 15 completes assembly of the upper portion of the rod. Tightening of bolts 25, 26, and 43 then completes the assembly operation.

In this form of the invention, it is sometimes desirable to add stiffening ridges 44 around the cross section of the piston pin ring portion 10.

Figure 8:
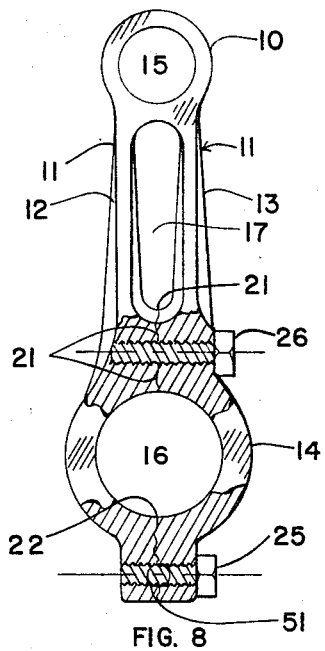
FIGURE 8 is a view similar to FIGURE 3 showing still another form of the present invention.
Figure 9:
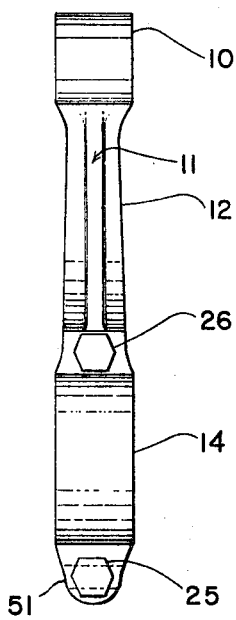
FIGURE 9 is a side view of the rod shown in FIGURE 8.

A still further form of this invention is shown in FIGURES 8 and 9, wherein the branches 12 and 13 of the shank 11 are designed to have sufficient flexibility in bending so that deflection of the branches alone permits assembly of the connecting rod over the crank pin. This obviates a fracturing of any portion of the piston pin ring portion 10. Since there is no fracture or slot in the piston pin ring portion 10, there is only negligible deflection in that portion during the assembly operation.

To enhance the size of the gap at 22 during assembly of the connection rod over a crank pin, a scissors-spreading device inserted in aperture 51 forces the crank pin ring portion apart. This thus adds the deflection of the crank pin ring portion 14 to the deflection of the branches 12 and 13, thereby minimizing the deflection required of the branches 12 and 13, with consequent minimizing of the spreading force imposed by a scissors-type spreading tool.

Elimination of the bolts and flanges or lugs from the conventional position on the sides of 90° and 270° position of the crank pin ring portion of the connecting rod results in a connecting rod of reduced width. Therefore, the width of the crank case portion of a reciprocating piston machine into which the connecting rod is assembled is minimized. This results in a savings of material and a more-compact design for the entire reciprocating piston machine and in some applications results in an improved performance. Such is the case for a crankcase scavenged two-cycle internal combustion engine, wherein the width of the crank case has a significant effect on the internal volume of the crank case. It is desirable to reduce the crank case internal volume to an absolute minimum to improve the breathing and charge transfer characteristics of the crank case scavenged engine.

The load on the bolt 26 securing the break 21 in the two branches of the shank, as shown in FIGURE 3 and FIGURE 4, also has a nominal loading as compared with the bolts in conventional two-piece connecting rod designs. At the top and bottom dead center positions of the crank pin, the bolt 26 load is theoretically zero from the longitudinal load in the connecting rod and is a very nominal value in approximately the 90° and 270° positions of the crank pin. The tensile forces in the bolt 26 required to restrain the break 21 from opening due to bending is very nominal due to the very stiff section modules of the crank pin ring portion 14 and the shank 11 in this region. In fact, this region of the connecting rod is structurally similar to an arch. The shear load at bifurcation 21 may be reacted through the irregular or interlocking mating surfaces associated with the fracture or it may be reacted through the branches 12 and 13 of the shank up to the piston pin in the bore 15.

While the instant invention has been shown and described herein in what is conceived to be the most practical and preferred embodiments, it is recognized that departures may be made therefrom within the scope of the invention which is, therefore, not to be limited to the details disclosed herein but is to be afforded the full scope of the invention as hereinafter claimed.

What is claimed is:
1. Process of fabricating and installing a unitary connecting rod in a reciprocating piston machine having a crank pin and a piston pin to be connected by said connecting rod, comprising the steps of:
   bifurcating a connecting rod having a piston pin bore formed and encircled by a piston pin ring portion at one end, a crank pin bore formed and encircled by a crank pin ring portion at the other end, and an integral shank connecting said ring portions, said connecting rod being formed of a single piece of metal;
   said bifurcation extending through a portion of said crank pin ring portion spaced from said shank, gen- erally along a longitudinal plane substantially passing through the axes of said bores, from said crank pin bore through said shank and at least to said piston pin ring portion;

spreading the two branches apart a sufficient distance to allow the crank pin ring portion to be placed over and around a crank pin;

closing the bifurcation so as to complete the ring portion around the crank pin; and securing the branches firmly together.

2. Process in accordance with claim 1, wherein said bifurcating comprises fracturing at least a portion of the connecting rod so as to form interlocking mating surfaces to insure accurate reassembly of the branches.

3. Process in accordance with claim 2, wherein said fracturing is effected in a brittle portion of said connecting rod.

4. Process in accordance with claim 1, including the step of forming a slot in said shank extending from said piston pin ring portion to said crank pin ring portion along said longitudinal plane, said slot constituting a portion of said bifurcation.

5. Process of fabricating a unitary connecting rod for a reciprocating piston machine, having a crank pin and a piston pin to be connected by said connecting rod, comprising the steps of:

bifurcating a connecting rod having a piston pin bore formed and encircled by a piston pin ring portion at one end, a crank pin bore formed and encircled by a crank pin ring portion at the other end, and an integral shank connecting said ring portions, said connecting rod being formed of a single piece of metal;

said bifurcation extending through a portion of said crank pin ring portion spaced from said shank, generally along a longitudinal plane substantially passing through the axes of said bores, from said crank pin bore through and shank at least to said piston pin ring portion.

6. Process in accordance with claim 5, wherein said shank has a slot therein extending between said ring portions, and said bifurcating comprises fracturing the material of said rod from said crank pin bore through said ring portion spaced from said shank, and, substantially in said plane, from said crank pin bore to one end of said slot.

7. Connecting rod for a reciprocating piston machine having a piston pin and a crank pin connected by the connecting rod;

said rod having a piston pin bore formed and encircled by a piston pin ring portion at one end;

a crank pin bore formed and encircled by a crank pin ring portion at the other end;

and an integral shank connecting said ring portions; and characterized as follows:

said connecting rod being bifurcated generally along a central longitudinal plane through said shank from said crank pin bore at least to said piston ring portion, said bifurcation also extending through a portion of said crank pin ring portion spaced from said shank;

thereby to bifurcate the rod into two branches joined by an integral portion of said piston pin ring portion, maintaining in said rod a unitary integral structure.

8. Connecting rod in accordance with claim 7, including means for clamping said branches firmly together.

9. Connecting rod in accordance with claim 8, wherein said clamping means comprises bolt means in the said spaced portion of said crank pin ring portion for holding said branches firmly together around the crank pin.

10. Connecting rod in accordance with claim 7, wherein said bifurcation comprises:

a slot extended from said piston pin ring portion to said crank pin ring portion;

a material fracture communicating between said crank pin bore and one end of said slot;

and a material fracture extending through said spaced portion of said crank pin ring portion.

11. Connecting rod in accordance with claim 7, wherein said bifurcation in the said spaced portion of said crank pin ring portion resides substantially in a plane passing substantially through the axis of said crank pin bore and lying at an angle of from 0° to 60° with respect to said central longitudinal bifurcation plane.

12. Connecting rod in accordance with claim 7, including:

a connecting bolt passing transversely through the connecting rod and disposed between said bores and adjacent said crank pin bore;

said connecting rod having a passage therethrough lying in said bifurcation plane and transverse to said bolt to permit insertion of a stop member;

so that inverse insertion of said connecting bolt will permit spreading of said branches and thereby allow said crank pin ring portion to be placed around a crank pin.

13. Connecting rod in accordance with claim 11, wherein said bifurcation in said spaced portion of said crank pin ring portion is formed by fracture of the material of said rod.

14. Connecting rod for a reciprocating piston machine, having a piston pin and a crank pin connected by the connecting rod;

said rod having a piston pin bore formed and encircled by a piston pin ring portion at one end;

a crank pin bore formed and encircled by a crank pin ring portion at the other end;

and an integral shank connecting said ring portion; and characterized as follows:

said connecting rod being bifurcated generally along a central longitudinal plane through said shank between said bores, said bifurcation continuing through a portion of said crank pin ring portion spaced from said shank;

thereby to bifurcate the rod into two branches joined by the integral portion of said piston pin ring portion extending around said piston pin bore, and maintaining in said rod a unitary integral structure.

15. Connecting rod in accordance with claim 14, wherein said bifurcation comprises:

a slot extended from said piston pin ring portion to said crank pin ring portion;

a material fracture communicating between said crank pin bore and one end of said slot;

a material fracture communicating between the other end of said slot and said piston pin bore, and a material fracture extending through said spaced portion of said crank pin ring portion.

16. Connecting rod in accordance with claim 14, wherein said bifurcation in the said spaced portion of said crank pin ring portion resides substantially in a plane passing substantially through the axis of said crank pin bore and lying at an angle of from 0° to 60° with respect to said central longitudinal bifurcation plane.

17. Connecting rod for a reciprocating piston machine having a piston pin and a crank pin connected by the connecting rod;

said rod having a piston pin bore formed and encircled by a piston pin ring portion at one end;

a crank pin bore formed and encircled by a crank pin ring portion at the other end;

and an integral shank connecting said ring portions; and characterized as follows:

said connecting rod being bifurcated generally along a central longitudinal plane through said shank from said crank pin bore to said piston pin ring portion, said bifurcation also extending through a portion of said crank pin ring portion spaced from said shank;

said piston pin ring portion having a substantially radial slot therethrough spaced from said shank;

thereby to bifurcate the rod into two branches joined by an integral portion of said piston pin ring portion adjacent said shank, maintaining in said rod a unitary integral structure;

and a substantially tangential bolt spanning said slot and completing a closure a closure around said piston pin bore.

18. Connecting rod in accordance with claim 17, including bolt means in the said spaced portion of said crank pin ring portion for holding said branches firmly together around the crank pin; and wherein said bifurcation comprises:

a slot extended from said piston pin ring portion to said crank pin ring portion;

a material fracture communicating between said crank pin bore and one end of said slot;

and a material fracture extending through said spaced portion of said crank pin ring portion.

References Cited by the Examiner
UNITED STATES PATENTS

| 1,006,632 | 10/1911 | Coppock | 74—579 |
| 2,969,585 | 1/1961 | Smith | 29—413 |

MILTON KAUFMAN, *Primary Examiner.*

W. S. RATLIFF, *Assistant Examiner.*